US006970563B1

(12) United States Patent
Risling (10) Patent No.: US 6,970,563 B1
(45) Date of Patent: Nov. 29, 2005

(54) SYSTEM FOR FAST SCRAMBLING AND DESCRAMBLING OF DATA

(75) Inventor: Micha Risling, Netanya (IL)

(73) Assignee: Mindspeed Technologies, Inc., Newport Beach, CA (US)

( * ) Notice: Subject to any disclaimer, the term of this patent is extended or adjusted under 35 U.S.C. 154(b) by 893 days.

(21) Appl. No.: 09/872,398

(22) Filed: Jun. 1, 2001

Related U.S. Application Data (60) Provisional application No. 60/208,642, filed on Jun. 1, 2000.

(51) Int. Cl.[7] ............................................. H04L 9/00
(52) U.S. Cl. ....................................... 380/42; 380/268
(58) Field of Search ................................. 340/2.24, 2.6; 380/42, 268

(56) References Cited

U.S. PATENT DOCUMENTS

| | | | |
|---|---|---|---|
| 4,410,990 A * | 10/1983 | Wilkinson | 714/798 |
| 4,827,513 A * | 5/1989 | Austin | 380/36 |
| 5,007,088 A * | 4/1991 | Ooi et al. | 380/46 |
| 5,459,723 A * | 10/1995 | Thor | 370/392 |
| 6,269,096 B1 * | 7/2001 | Hann et al. | 370/366 |

* cited by examiner

Primary Examiner—Gilberto Barrón, Jr.
Assistant Examiner—Venkat Perungavoor
(74) Attorney, Agent, or Firm—Weide & Miller, Ltd.

(57) ABSTRACT

A method for parallel scrambling of a sequence of serially transmitted digital bits comprises an initializing scrambling step and subsequent scrambling step. The initializing scrambling step comprises the steps of generating a scrambling bit sequence and storing the scrambling bit sequence in a scrambling register. The subsequent scrambling step comprises:

storing a sequential group of bits in the same sequence in which they were received, each of the group of bits containing the same number or fewer bits than the scrambling bit sequence; XOR-ing the sequential group of bits with corresponding bits of the scrambling bit sequence in parallel, thereby generating scrambled bits; and shifting the bits in the scrambling register by a number of spaces equal to the number of scrambled bits and subsequently transmitting and storing the scrambled bits in corresponding cells of the scrambling register in lowest ordinal sequence for use in subsequent XOR-ing of a next sequential group of bits.

22 Claims, 6 Drawing Sheets

SYSTEM FOR FAST SCRAMBLING AND DESCRAMBLING OF DATA

CROSS-REFERENCE TO RELATED APPLICATIONS

The present application claims the priority of U.S. Provisional Patent Application 60/208,642, filed 1 Jun. 2000.

FIELD OF THE INVENTION

The present invention relates to an improved method and system for use in digital communication networks. More particularly, the present invention relates to a method which is useful for faster scrambling of transmitted data, and descrambling of received data, by devices utilizing the High Level Data Link Control/Asynchronous Transfer Mode (hereinafter "HDLC/ATM") communication standard and similar or compatible standards and to an integrated circuit embodying the method.

BACKGROUND OF THE INVENTION

Certain problems are often encountered during the transmission of digital data. These problems include:
[1] When digital messages contain long strings of 0's or of 1's, these strings might be misinterpreted by the receiver, or cause other problems, and are therefore undesirable or forbidden. An example of such a forbidden bit sequence is a long string of 0's, which might be interpreted by the receiver as a communication line interruption or as a power off signal rather than as an actual sequence of 0's to be transmitted.
[2] It is desirable, due to electrical considerations, to transmit messages comprising of roughly equal numbers of 0 and 1 bits. However, the actual data to be transmitted may include long strings of 0's or of 1's, or it may include very different numbers of 0 and 1 bits.
[3] In addition, it may be desirable to make the transmitted data unintelligible, i.e. scrambled or encrypted, to a third party intercepting it.

To address these issues, it is known to change some of the 0 bits to 1 bits of the messages, and vice versa, before their transmission, by a process called scrambling.

Because scrambling of transmitted message changes the bytes and the overall message, it has to be reversed at the receiving station, thereby restoring the original bit sequence and the original message, i.e. descrambling. Many scrambling and descrambling (hereinafter "SD") methods have been proposed and some are in use. Many SD methods, including the method required by the HDLC/ATM standard, are based on modulo-2 summing of each data bit in a data sequence to be scrambled and of a scrambling bit of a scrambling sequence, the modulo-2 summing result being the scrambled bit. A single modulo-2 summing operation could also be performed by a two-input XOR gate. Hereinafter, modulo-2 summing operation will be referred to as a "XOR" operation. XOR-ing of the scrambled data bit with the same scrambling bit restores the original data bit, i.e. descrambles it.

The SD system employed by the HDLC/ATM standard performs a XOR operation on the k-th message bit with the already scrambled (k−43)rd bit of the message, where "k" designates the ordinal number of a bit in any sequence of bits. The index "n" designates hereinbelow the ordinal number of a group of bits processed in parallel. The index "i" designates hereinbelow the ordinal number of a bit within a group of bits processed in parallel. "D(k)" designates hereinbelow the k-th input bit to be scrambled, or the k-th descrambled output bit, and "S(k)" designates hereinbelow the k-th scrambled bit. An initial random forty three bit sequence is used to permit the XOR-ing of the first message bits. This necessitates the storage by both the transmitter's scrambler and by the receiver's descrambler of at least the last forty three scrambled and transmitted bits in order to scramble and descramble the current and the subsequent communicated bits. The initial bit sequence used for the scrambling and the descrambling of the first forty three message bits is usually all zeroes and must be stored in both the scrambler and the descrambler.

The output of two successive XOR operations on a data bit by two identical scrambling bits is the initial data bit. Thus the first XOR operation operates on a first data bit input and on a scrambling bit, and generates a first output bit. The two inputs to the second XOR operation are the first output bit from the first XOR operation and the same scrambling bit and the output of the second XOR operation is the initial data bit. Therefore, a repeated application of the first XOR operations generates a scrambled bit sequence while a repeated application of a second XOR operations as described hereinabove restores or descrambles the original digital string.

According to the standard HDLC/ATM scrambling method, the scrambling of each bit in a sequence comprising the transmitted message is the output of a XOR gate whose two input bits are the k-th data bit of the string and the k-43rd scrambled bit of the sequence. This way each bit of the scrambled sequence to be transmitted is generated. The descrambling is done by operating on pairs of the scrambled string bits spaced apart by the same spacing of forty three. Other methods exist in which the data stream is operated on by a previously defined sequence of bits, usually called a polynomial.

The rate at which data can be serially transmitted over a single line connecting a transmitter and a receiver (serial rate) is often much higher than the data processing rate since the data processing includes many operations, such as storing, scrambling and descrambling of the data by the transmitter and the receiver. Thus the data processing rate is often a rate limiting step in such communications.

U.S. Pat. No. 5,163,092 and its continuation, U.S. Pat. No. 5,185,799 to John McNesby et al., describe a parallel scrambling method useful for a different standard, SONET. The aforementioned patents disclose a device in which a sequence of eight serially-transmitted data bits (one byte) is loaded into eight registers and then these bits are processed simultaneously according to the scrambling and descrambling algorithm of the standard disclosed therein. However, the disclosed methods are not useful for scrambling/descrambling of HDLC/ATM transmissions.

SUMMARY OF THE INVENTION

The present invention deals with improved systems for the scrambling and/or the descrambling of data transmitted using the HDLC/ATM standard. According to the present invention, there is provided a parallel processing SD system, which may be incorporated into a single integrated circuit, for substantially accelerating the data processing rate in devices using HDLC/ATM standard and derivatives thereof. The parallel processing SD system of the present invention stores serially transmitted input bits and a copy of recently scrambled and serially transmitted input bits, in registers of appropriate sizes, performing the XOR SD operation in parallel on a plurality of bits, and then serially transmitting the output of the XOR operation.

Parallel scrambling substantially accelerates the data processing rate, and has the added advantage that an integral number of bytes may be processed at a time. Clearly, the higher the number of data bits processed in parallel, the higher the data processing rate will be.

Thus it is one purpose of the present invention to offer a system for the parallel scrambling and descrambling of four HDLC/ATM transmitted bytes, and that can also be easily adapted to the parallel processing of different numbers of bits.

BRIEF DESCRIPTION OF THE DRAWINGS

The present invention will be better understood and appreciated with reference to the following detailed description taken in conjunction with the drawings in which.

DETAILED DESCRIPTION OF THE INVENTION

Figure 1:
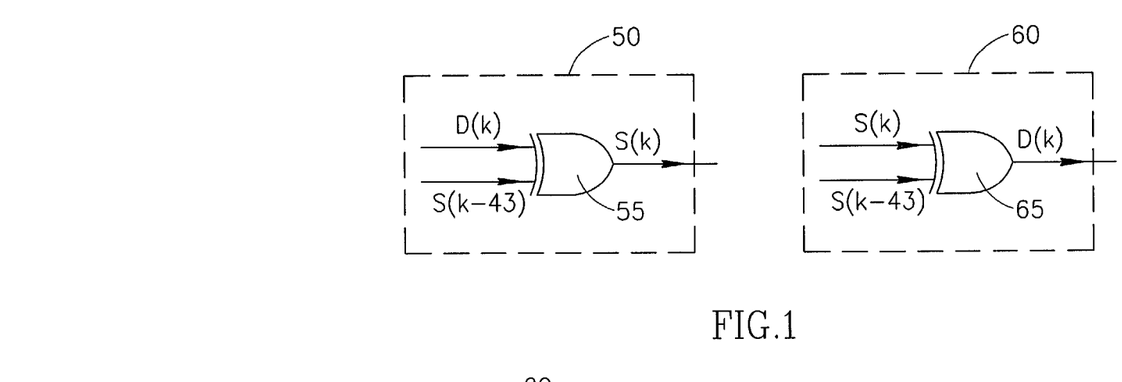
FIG. 1 is a schematic illustration of a scrambling/descrambling HDLC/ATM SD algorithm operation.

A better understanding of the present invention might be achieved by first referring to FIG. 1, a depiction of the HDLC/ATM standard requirements, in which 50 is a scrambler operatively connected to a transmitter (not shown), and 55 is a XOR gate for scrambling a sequence of data bits. XOR gate 55 has as one input D(k), the k-th data bit in a sequence, and as the other input scrambling bit S(k−43). XOR gate 55 output is S(k), the k-th scrambled bit. S(k) is then transmitted to a receiver (not shown) to which descrambler 60 is operatively connected. S(k) is then descrambled by XOR gate 65 having as one input S(k), as the second input S(k−43), i.e. the scrambling bit, and as the descrambled output—bit D(k), the data bit.

Figure 2:
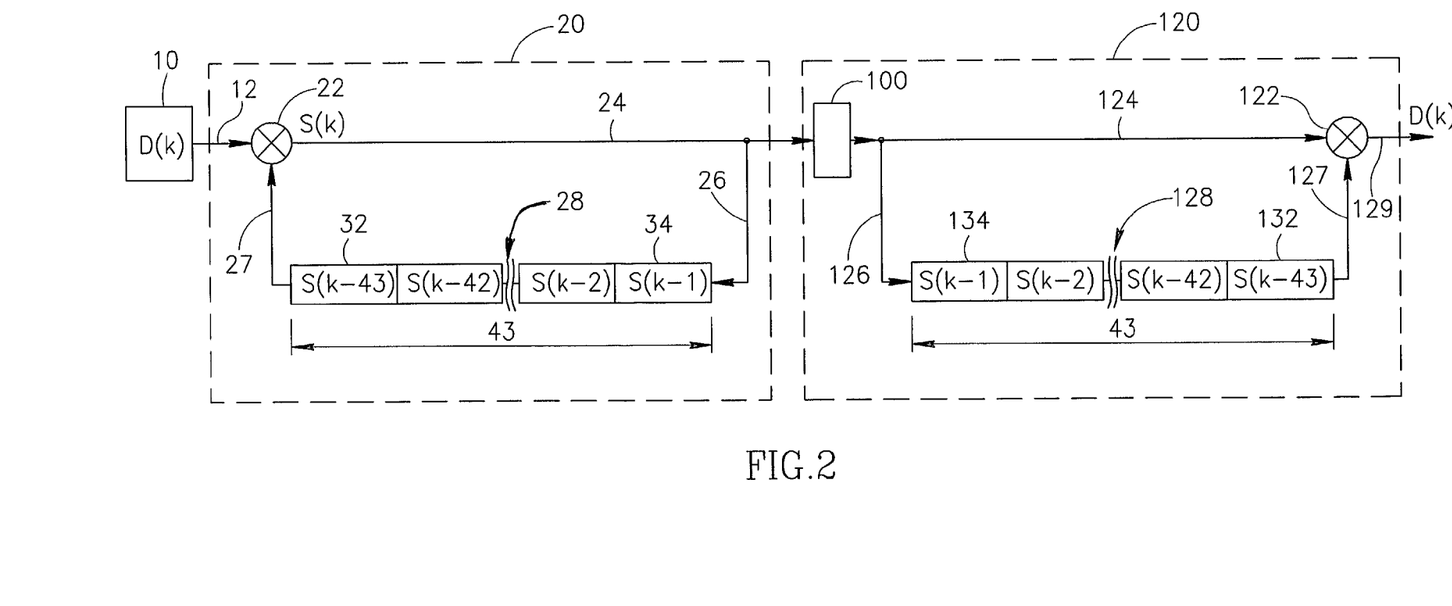
FIG. 2 is a schematic illustration of a scrambling/descrambling circuitry taught in prior art HDLC/ATM SD operation.

Referring now to FIG. 2, there is depicted a schematic SD system representative of those taught in prior art HDLC/ATM standard related publications, in which transmitter 10 transmits data serially along line 12 into scrambler 20 of a communication system. Line 12 is connected to one of two input terminals of XOR gate 22 that performs the scrambling operation on bit D(k) by XOR-ing it with S(k−43) and outputs the scrambled bit S(k) into lines 24 and 26. Line 26 is connected to a serial forty three bit storage cells comprising shift register 28, for storing already scrambled and transmitted data. Said bit storage cells forming part of a register could be constituted by flip-flops and will be referred to hereinbelow as "cells". The data is loaded one bit at a time: as newly scrambled bits are input one at a time via line 26 and stored in cell 34 of shift register 28, the other previously stored bits are shifted towards cell 32 of the shift register and are eventually lost. A clock (not shown) provides a line with an enabling signal via parallel connections to the appropriate cells, for the bit storage and the bit shifting. The oldest bit S(k−43), stored in shift register 28 leftmost cell 32, is the scrambled output S(k−43) of data bit D(k−43) and therefore precedes the current data bit D(k) to be scrambled by forty three bits. Bit S(k−43) is input into the second input terminal of XOR gate 22, and is XOR-ed with bit D(k) to generate the gate's output bit S(k). Bit S(k) is then transmitted along line 24 to receiver 100 and along line 26 to shift register 28 into which it is then loaded. while bit S(k−43) is lost and bit S(k−42) is shifted into cell 32 and is ready to be input into XOR gate 22 next operation on D(k+1). Thus, a forty three bit difference always exists between the XOR-ed data bit and the scrambled bit. An initial sequence of forty three bits is then loaded into register 28 to permit the initial SD operation.

The descrambling of the transmitted data takes place in descrambler 120. Transmitted bit S(k) is input via line 24 to receiver 100, by line 126 to cell 134 of shift register 128, and via line 124 into one of two input terminals of XOR gate 122. Stored bit S(k−43) is input via line 127 to the second terminal of XOR gate 122. The output bit of XOR gate 122 is output to line 129 and is identical to D(k). Therefore circuit 120 descrambles bit S(k), scrambled by circuit 20.

Figure 3:
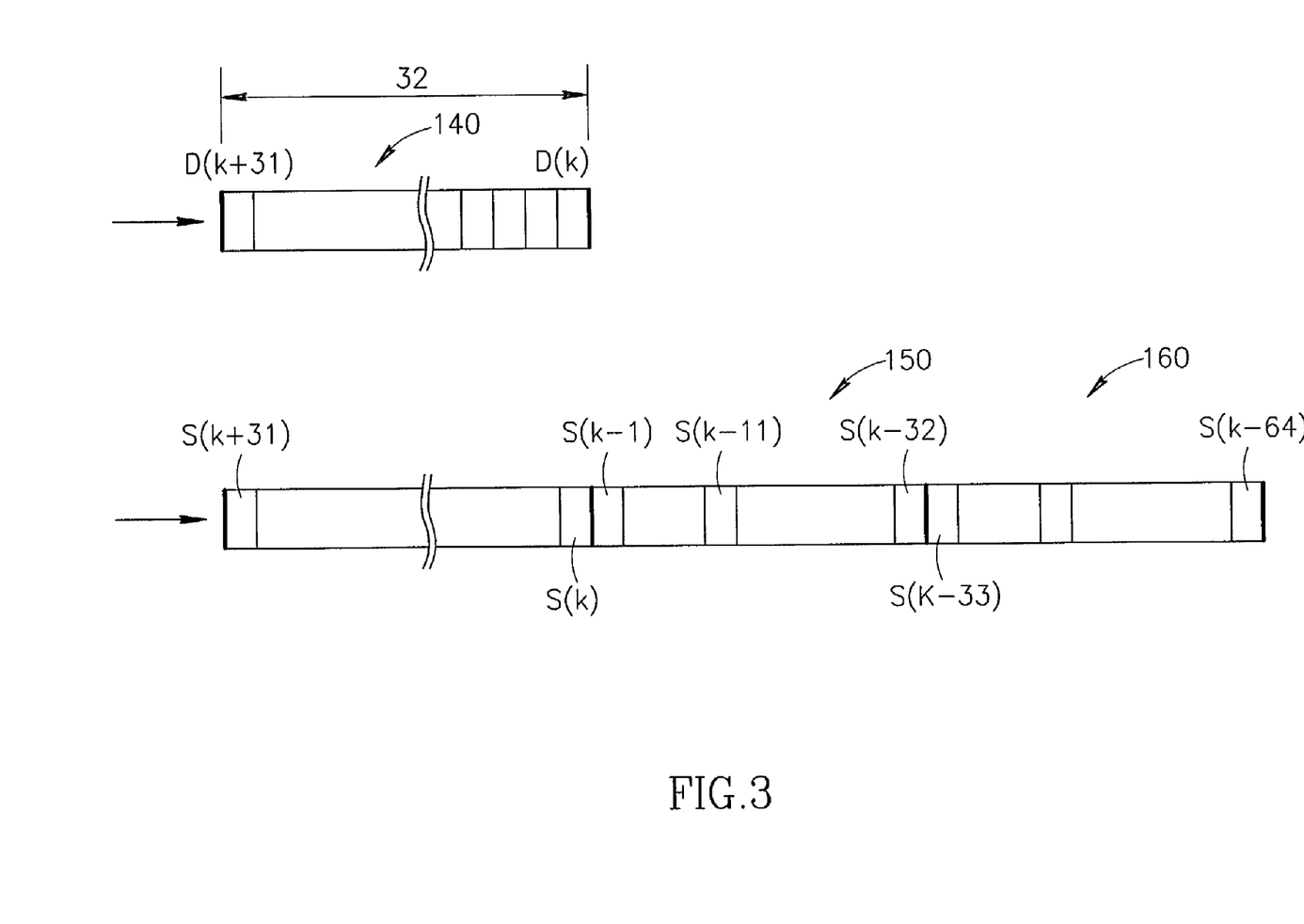
FIG. 3 is a schematic illustration of the storage requirements for HDLC/ATM SD operation.

Referring now to FIG. 3, there is shown a schematic illustration of the storage requirements for the parallel scrambling of thirty two serially transmitted bits at a time, according to the present invention, in which "n" is the ordinal number of the group of bits currently processed in parallel, n equals 32 in this embodiment. Shift register 140 stores bits D(32*n) to D(32*n+31), the thirty two current input bits to be scrambled and transmitted. Shift register 150 stores S(32*n−1) to S(32*n−32), i.e. the thirty two bits scrambled and transmitted during the previous parallel scrambling step, and shift register 160 stores at least S(32*n−33) to S(32*n−43), i.e. the last eleven bits of the thirty two bits scrambled and transmitted during the prior to the previous operation. Storing of scrambled bits from two preceding thirty two bit groups is necessary, since the scrambling of input bit D(32*n+i) is done by inputting to a XOR gate the D(32*n+i) bit and an S(32*n+i−43) bit, and thus scrambled bits from two previous steps need to be stored and be accessible for scrambling of new data. In this way D(32*n+31) is scrambled by being input with S(32*n−11) and D(32*n) is scrambled by being input with S(32*n−43).

Similar SD schemes could be devised for different number of input bits processed in parallel, such as 8, 16, 24 or 40, or for standards which call for scrambling the input data by using scrambled input bits that are spaced apart by spacings other than forty three. Also note that up to forty three bits can be processed in parallel according to the HDLC/ATM standard by the application of the present invention.

Figure 4:
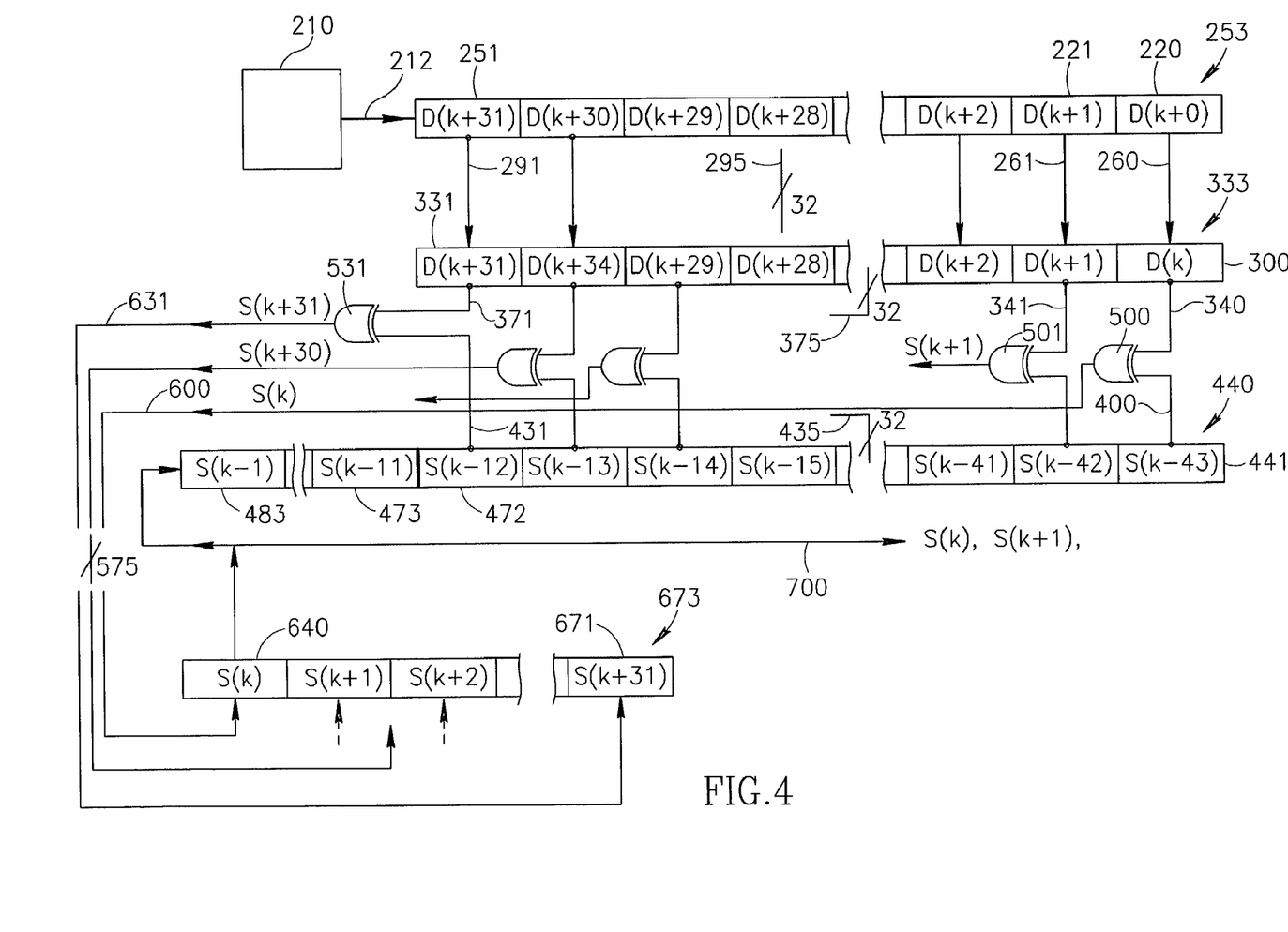
FIG. 4 is a schematic illustration of circuitry used in HDLC/ATM scrambling operation according to the present invention.

With reference to FIG. 4, there is shown a schematic illustration of a circuit according to an exemplary embodiment of a thirty two bit parallel scrambler constructed in accordance with the present invention. It should be realized that a different number of bits could be processed in parallel according to the present invention, however thirty two has been selected as illustrative of an example where a relatively large number of bits are processed in parallel, and yet the method remains convenient in terms of economics and current technology.

Systems and methods for the parallel processing of other numbers of bits, such as 8, 16, or 24 bits could easily be constructed based on the description of the invention presented herein.

All of the devices such as memory cells and XOR gates that require enabling and disabling signals are connected by conductor lines to appropriate signal sources such as clocks, as is familiar.

A transmitter 210 serially transmits bits D(k) via line 212 into a serial-to-parallel shift register 253. Register 253 comprises thirty two cells 220 to 251 storing thirty two currently processed bits numbered D(32*n) to D(32*n+31), said parallel numbering being equivalent to serial numbering of D(k) to D(k+31).

Each one of thirty two memory cells 220 to 251 is connected to one of corresponding thirty two cells 300 through 331 of parallel register 333 via corresponding lines 260 through 291, said lines 260 through 291 forming bus 295. Once register 253 is loaded, an enabling signal is generated, permitting the contents of its cells 220 to 251 to be copied in parallel into corresponding cells 340 to 371 of register 300.

Corresponding output terminal of each of memory cells 340 to 371 is connected to a corresponding input terminal of thirty two XOR gates 500 to 531 via corresponding lines 340 to 371, forming bus 375. The second input terminal of each XOR gate 500 to 531 is correspondingly connected to memory cells 441 to 472 of at least forty three cell shift register 440, storing at least forty three previously scrambled bits S(32*n−43) to S(32*n−11) for scrambling current input bits D(32*n) to D(32*n+31). At least eleven other memory cells 473 to 483 of scrambling register 440, for storing scrambled bits S(32*n) to S(32*n−11), are not connected to XOR gates 500 to 531. Their contents are stored for use in the next parallel scrambling step.

Therefore, the two input terminals of each one of XOR gates 500 to 531, generally denoted as number (500+i), are connected to D(32*n+i) and to S(32*n+i−43), respectively, i being a number between 0 and 31, e.g each XOR gate is connected to a first input bit and to a scrambled bit outputted from an input bit that preceded said first input bit by forty three bits, as is required by the HDLC/ATM standard.

The output bit of each of said 500 to 531 XOR gates is transmitted via corresponding lines 600 to 631, forming bus 575, into corresponding cells 640 to 671 in register 673. After performance of the XOR operation, the contents of register 440 cells S(32*n−1) through S(32*n−11) are shifted by thirty two places, into cells S(32*n−33) through cell S(32*n−43). Then the contents of cells 640 to 671 of register 673, the newly scrambled bits S(32*n) to S(32*n+31), are moved into cells 472 to 441 of scrambling register 440, replacing S(32*n−32) to S(32*n−1), correspondingly. Registers 253 and 300 can then be loaded with the next thirty two transmitted input bits. Also, during the loading of register 440 from register 673, newly scrambled bits S(32*n) to S(32*n+31) can be serially transmitted via line 700.

Figure 5:
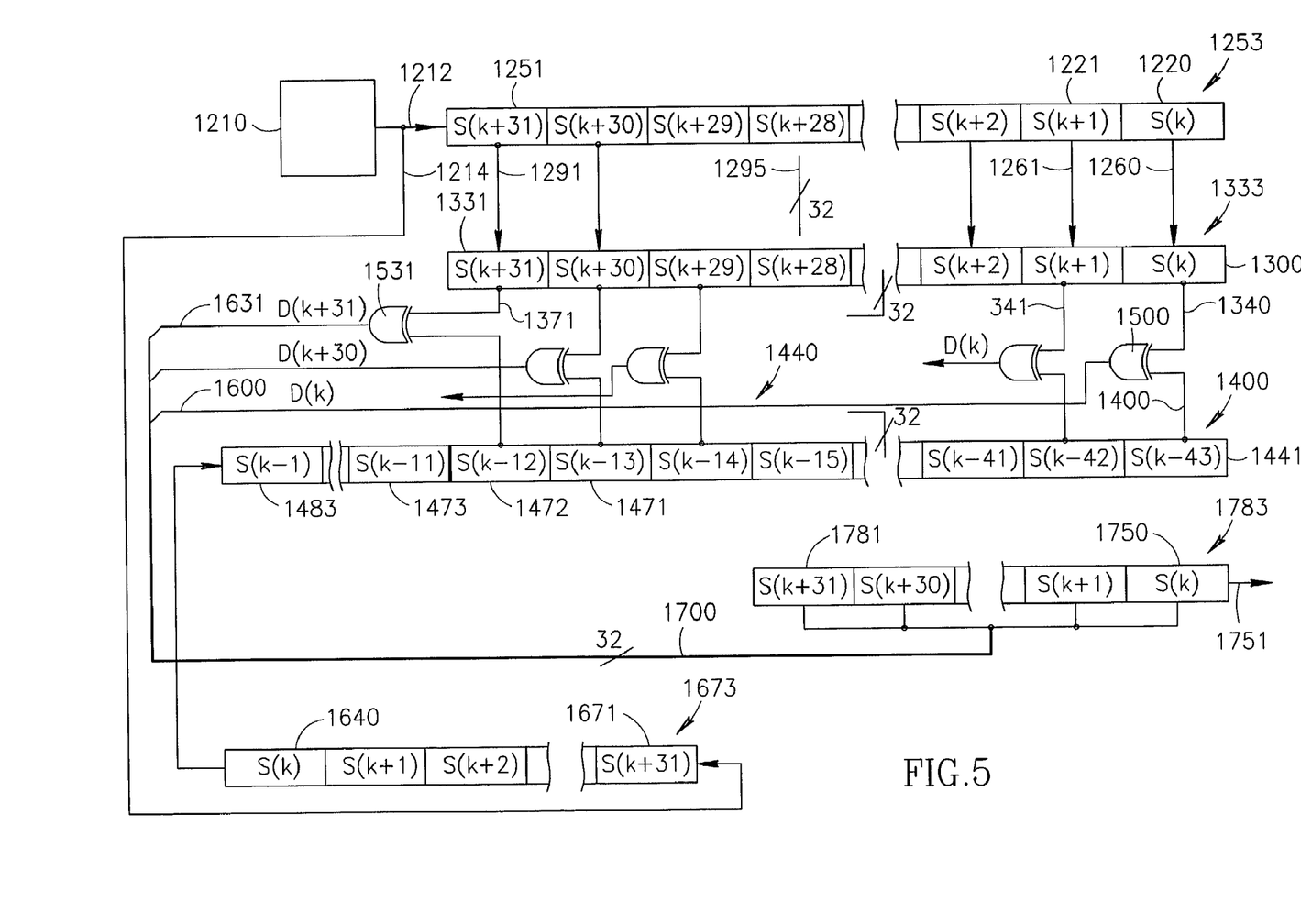
FIG. 5 is a schematic illustration of circuitry used in HDLC/ATM descrambling operation according to the present invention.

Referring now to FIG. 5, there is shown a descrambling system used by the receiver for the processing of thirty two bits parallel according to the present invention. Additionally, methods for the parallel processing of other numbers of bits, such as eight, sixteen, or twenty four could easily be adapted from the invention presented herein. Also, it is not required to have both the scrambler and the descrambler made to process in parallel the same number of bits. One of them could even be a simple serial scrambler or descrambler. A receiver 1210 serially receives scrambled bits S(32*n+i) via line 1212 and into a serial to parallel shift register 1253. Shift register 1253 comprises of thirty two memory cells 1220 to 1251 storing thirty two most recently transmitted scrambled bits S(32*n) to S(32*n+31). Memory cells 1220 to 1251 are connected to thirty two corresponding cells 1300 through 1331 of parallel register 1333 via corresponding lines 1260 through 1291, said lines forming bus 1295. Output terminals of each one of memory cells 1300 to 1331 are correspondingly connected to one input terminal of each one of thirty two XOR gates 1500 to 1531 via corresponding lines 1340 to 1371 forming bus 1375. The second input terminal of each one of XOR gates 1500 to 1531 is correspondingly connected to memory cells 1441 to 1472 of a forty three cell shift register 1440, storing thirty two previously received scrambled bits S(32*n−43) to S(32*n−12). Eleven other memory cells 1473 to 1483 of scrambling register 1440, storing received, scrambled bits S(32*n−1) to S(32*n−11), are not connected to XOR gates, their contents is stored to be used in the next parallel scrambling step after shifting.

Therefore, the two input terminals of each one of said XOR gates, generally denoted as number (1500+i), are connected to S(32*n+i) and to S(32*n+i−43), i being a number between 0 and the number of bits processed in parallel, thirty two in this embodiment. Each XOR gate is connected to a first input bit and to a scrambled bit outputted from an input bit that preceded said first input bit by forty three bits, as is required by the HDLC/ATM standard. The output bit of each of said XOR gates D(32*n) to D(32*n+31) is transmitted via corresponding lines 1600 to 1631, forming bus 1700, into corresponding cells 1750 to 1781 in register 1783. After carrying out of the XOR operation, the contents of register 1440 cells S(32*n−1) to S(32*n−11) is shifted by thirty two places, into cells S(32*n−12) to cell S(32*n−43). Then the newly received, scrambled bits S(32*n) to S(32*n+31), forming the contents of cells 1640 to 1671, connected to line 1212 by line 1214 of register 1673 is moved into cells 1472 to 1441 of scrambling register 1440, replacing the contents of cells S(32*n−32) to S(32*n−1), correspondingly. Registers 1253 and 1333 can then be loaded with the next thirty two received bits. Also, during the loading of register 1440 from register 1673, newly descrambled bits D(32*n) to D(32*n+31) can be serially transmitted via line 1700.

Figure 6:
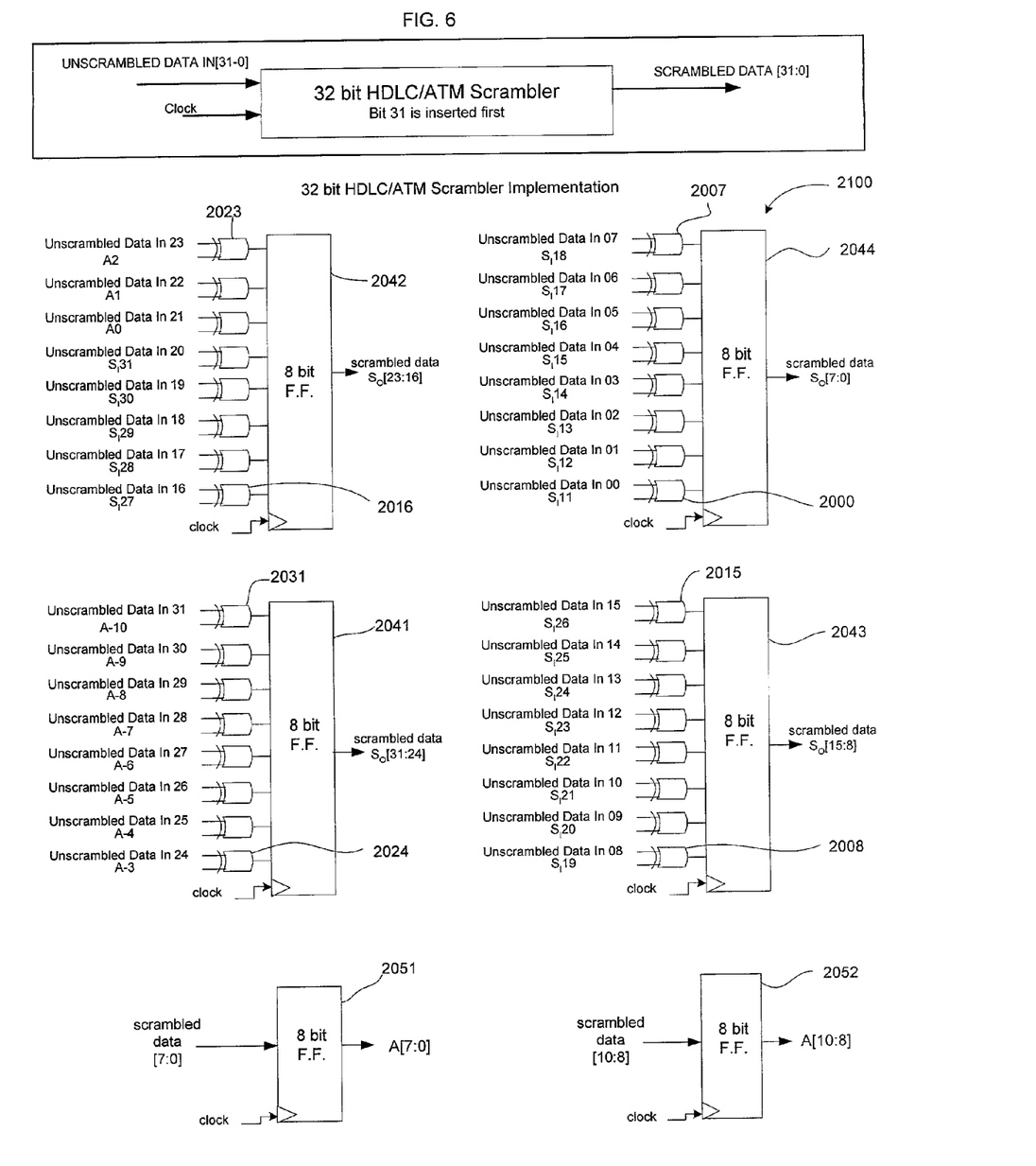
FIG. 6 is a detailed drawing of part of an embodiment of the circuitry shown in FIG. 4 and used in HDLC/ATM scrambling operation according to the present invention.

Referring now to FIG. 6, there is shown a detailed view of an embodiment 2100 of the present invention of a system for the parallel scrambling of thirty two serially transmitted bits. XOR gates 2000 through 2031 are divided into four sequential eight-bit groups each, for the scrambling of unscrambled bits D(31) through D(0) respectively, wherein bit D(31) is the first to be input and bit D(0) is the last to be input in a sequence of thirty two serial bits. Each one of bits D(31) through D(0) forms one input to said XOR gates, the second input bit being an already scrambled bit: scrambled bits designated $S_i(31)$ through $S_i(0)$ (wherein Si designates Scrambled input) were scrambled in the previous cycle, and scrambled bits designated A(10) through A(0) were scrambled in the cycle preceding said previous cycle. Bits A(0) through A(7) are stored in register 2051, and bits A(8) through A(10) are stored in register 2052. The thirty two output bits of XOR gates 2000 through 2031 are the currently scrambled bits $S_o(0)$ through $S_o(31)$, respectively (wherein $S_o$ denotes scrambled output), and are stored in four eight-bit registers 2041 through 2044, from which they may be transmitted serially or in parallel by any other device, not shown here.

Figure 7:
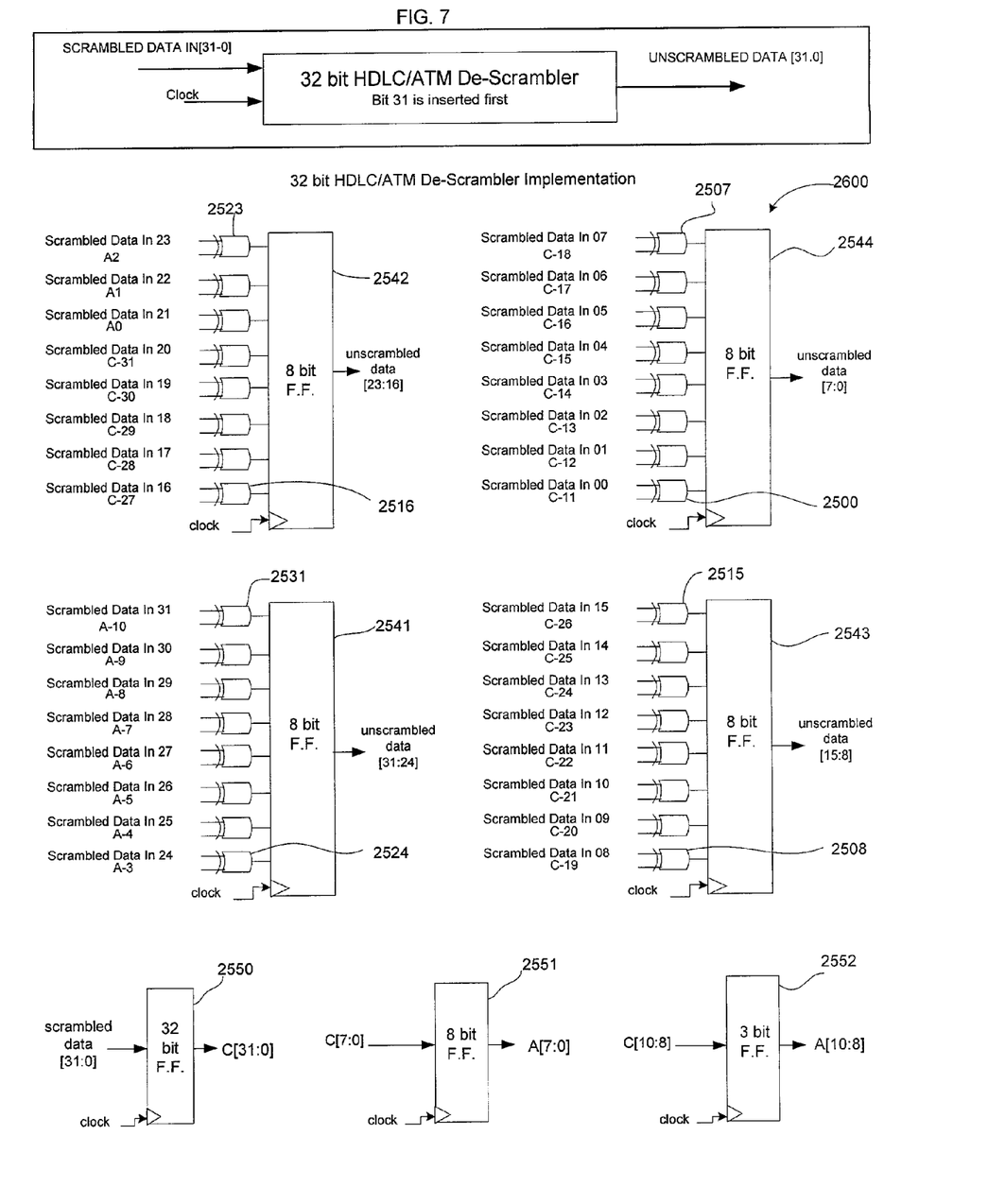
FIG. 7 is a detailed drawing of part of an embodiment of the circuitry shown in FIG. 5 and used in HDLC/ATM descrambling operation according to the present invention.

Referring now to FIG. 7, there is shown a detailed view of an embodiment 2600 of the present invention of a system for the parallel descrambling of thirty two serially transmitted scrambled bits. XOR gates 2500 through 2531 are divided into four eight-bit groups each, for the descrambling of transmitted, scrambled bits S(31) through S(0) respectively, wherein bit S(31) is the first to be input and bit S(0) is the last to be input in a sequence of thirty two serial bits. Each one of bits S(31) through S(0) forms one of two inputs to said XOR gates, the second input bit being a scrambled bit previously transmitted forty three bits earlier: bits designated C(31) through C(0) were scrambled and transmitted in the previous thirty two bit sequence, and are stored in flip-flop register 2550. Bits designated A(10) through A(0) were scrambled in the sequence preceding said previous cycle and are stored in flip-flop register 2551, A(7) through A(0) and in flip-flop register 2552, A(10) through A(8). The thirty two output bits of XOR gates 2500 through 2531 are the descrambled bits D(O) through D(31), respectively, and are stored in four eight-bit flip-flop registers 2541 through 2544, from which they may be transmitted serially or in parallel for further processing.

The foregoing description of an exemplary embodiment is presented in order to enable a person of ordinary skill in the art to design, make and utilize the present invention. Various modifications and adaptations to the exemplary embodiment will be apparent to those skilled in the art, and different modifications may be applied to different embodiments. Therefore, it will be appreciated that the invention is not limited to what has been described hereinbelow merely by way of example. Rather, the invention is limited solely by the claims which follow this description.

I claim:

1. A method for parallel scrambling of a sequence of serially transmitted digital bits, said method comprising an initializing scrambling step and subsequent scrambling step;
    said initializing scrambling step comprising the steps of generating a scrambling bit sequence and storing said scrambling bit sequence in a scrambling register;
    and said subsequent scrambling step comprising:
        storing a sequential group of bits in the same sequence in which they were received, each of said group of bits containing the same number or fewer bits that said scrambling bit sequence;
        XOR-ing said sequential group of bits with corresponding bits of said scrambling bit sequence in parallel, thereby generating scrambled bits;
        shifting said bits in said scrambling register by a number of spaces equal to the number of scrambled bits and subsequently transmitting and storing said scrambled bits in corresponding cells of said scrambling register in lowest ordinal sequence for use in subsequent XOR-ing of a next sequential group of bits.

2. A method for parallel scrambling of a sequence of serially transmitted digital bits in accordance with claim 1, wherein said scrambling bit sequence is comprised of forty three bits.

3. A method for parallel scrambling of a sequence of serially transmitted digital bits in accordance with claim 1, wherein thirty two bits are processed in parallel.

4. A method for the transmission of digital data in a communication network between any number of transmitters, receivers and transceivers, said method comprising an initializing scrambling step and subsequent scrambling step:
    said initializing scrambling step comprising the steps of generating a scrambling bit sequence and storing said scrambling bit sequence in a scrambling register;
    and said subsequent scrambling step comprising:
    storing a sequential group of bits in the same sequence in which they were received, each of said group of bits containing the same number or fewer bits than said scrambling bit sequence;
        XOR-ing said sequential group of bits with corresponding bits of said scrambling bit sequence in parallel, thereby generating scrambled bits;
        shifting said scrambling register by a number of spaces equal to the number of scrambled bits and subsequently transmitting and storing said scrambled bits in corresponding cells of said scrambling register in lowest ordinal sequence for use in subsequent XOR-ing of a next sequential group of bits.

5. A method for parallel scrambling of a sequence of serially transmitted digital bits in accordance with claim 4, wherein said scrambling bit sequence is comprised of forty three bits.

6. A method for parallel scrambling of a sequence of serially transmitted digital bits in accordance with claim 4, wherein thirty two bits are scrambled in parallel.

7. A method for parallel descrambling of a sequence of serially transmitted digital bits, said method comprising an initializing descrambling step and subsequent descrambling step;
    said initializing descrambling step comprising the steps of generating a descrambling bit sequence identical to said scrambling sequence, and storing said descrambling bit sequence in a descrambling register;
    and said subsequent descrambling step comprising:
    storing a sequential group of bits in the same sequence in which they were received, each of said group of bits containing the same number or fewer bits than said descrambling bit sequence;
        XOR-ing said sequential group of bits with corresponding bits of said descrambling bit sequence in parallel, thereby generating descrambled bits;
        shifting said descrambling register by a number of spaces equal to the number of descrambled bits and subsequently transmitting and storing said scrambled bits in corresponding cells of said descrambling register in lowest ordinal sequence for use in subsequent XOR-ing of a next sequential group of bits.

8. A method for parallel descrambling of a sequence of serially transmitted digital bits in accordance with claim 7, wherein said descrambling bit sequence is comprised of forty three bits.

9. A method for parallel descrambling of a sequence of serially transmitted digital bits in accordance with claim 7, wherein thirty two bits are descrambled in parallel.

10. A method for the reception of digital data in a communication network between any number of transmitters, receivers and transceivers, said method comprising an initializing descrambling step and subsequent descrambling step:
    said initializing descrambling step comprising the steps of generating a descrambling bit sequence and storing said descrambling bit sequence in a descrambling register;
    and said subsequent descrambling step comprising:
    storing a sequential group of bits in the same sequence in which they were received, each of said group of bits containing the same number or fewer bits than said descrambling bit sequence;

XOR-ing said sequential group of bits with corresponding bits of said descrambling bit sequence in parallel, thereby generating descrambled bits;

shifting said descrambling register by a number of spaces equal to the number of descrambled bits and subsequently transmitting and storing said descrambled bits in corresponding cells of said descrambling register in lowest ordinal sequence for use in subsequent XOR-ing of a next sequential group of bits.

11. A method for parallel descrambling of a sequence of serially transmitted digital bits in accordance with claim 10, wherein said descrambling bit sequence is comprised of forty three bits.

12. A method for parallel descrambling of a sequence of serially transmitted digital bits in accordance with claim 10, wherein thirty two bits are descrambled in parallel.

13. A system for the repeated parallel scrambling of a sequence of a first number of serially transmitted input bits, said system being connected to:
a source of serially transmitted bits;
said system comprises:
an input register comprising a first number of cells for storing a sequence of bits in the same sequence in which they were received;
a scrambling register comprising at least a second number of cells, said second number being higher than the number of bits in said received group, for storing at least said second number of scrambling bits, wherein initially:
a second number of bits is loaded into said scrambling register, and subsequently:
each scrambling bit is a scrambled bit preceding the bit to be scrambled by it, by said second number;
two or more XOR gates for the parallel scrambling of said first number of input bits, having two inputs and one output each, wherein:
one XOR gate input is correspondingly connected to a cell in said first register;
second XOR gate input is correspondingly connected to a cell in said scrambling register;
said one XOR gate output is:
stored for corresponding sequential transmission to a receiver;
stored for subsequent use in said scrambling register for scrambling a next input bit separated from said input bit by said second number of bits;
said system further comprises:
clock means operatively connected for the enabling and the disabling of data handling operations.

14. A system for the parallel scrambling of a sequence of serially transmitted digital bits according to claim 13 wherein said first number is thirty two.

15. A system for the parallel scrambling of a sequence of serially transmitted digital bits according to claim 13 wherein said second number is forty three.

16. A system for the repeated parallel descrambling of a sequence of a first number of serially transmitted input scrambled bits, said system being connected to:
a source of serially transmitted scrambled bits;
said system comprises:
an input register comprising a first number of cells for storing a sequence of scrambled bits in the same sequence in which they were received;
a descrambling register comprising at least a second number of cells, said second number being higher than the number of bits in said received group, for storing at least said second number of descrambling bits, wherein initially:
a second number of bits is loaded into said descrambling register, and subsequentially:
each descrambling bit is a scrambled bit preceding the bit to be descrambled by it, by said second number;
two or more XOR gates for the parallel descrambling of said first number of input bits, having two inputs and one output each, wherein:
one XOR gate input is correspondingly connected to a cell in said first register;
second XOR gate input is correspondingly connected to a cell in said descrambling register;
said one XOR gate output is:
stored for corresponding sequential transmission to a receiver;
stored for subsequent use in said descrambling register for descrambling next input bit separated from said input bit by said second number of bits;
said system further comprises:
clock means operatively connected for the enabling and the disabling of data handling operations.

17. A system for the parallel descrambling of a sequence of serially transmitted digital bits according to claim 16 wherein said first number is thirty two.

18. A system for the parallel descrambling of a sequence of serially transmitted digital bits according to claim 13 wherein said second number is forty three.

19. A system for the parallel descrambling of a sequence of serially transmitted digital bits according to claim 16 wherein said first number is thirty two.

20. A system for the parallel descrambling of a sequence of serially transmitted digital bits according to claim 16 wherein said second number is forty three.

21. A method in accordance with claim 1 wherein:
one input for each XOR operation is a descrambled bit in a sequence of descrambled bits,
a second input for each XOR operation is a scrambled bit of said sequence, preceding said descrambled bit by forty three bits,
the output of each one of said XOR operation is a scrambled bit in a sequence of scrambled bits.

22. A method in accordance with claim 1 wherein:
one input for each XOR operation is a scrambled bit in a sequence of scrambled bits,
a second input for each XOR operation is a scrambled bit of said sequence, preceding said scrambled bit by forty three bits,
the output of each one of said XOR operation is an descrambled bit in a sequence of descrambled bits.

* * * * *